Patented Feb. 28, 1939

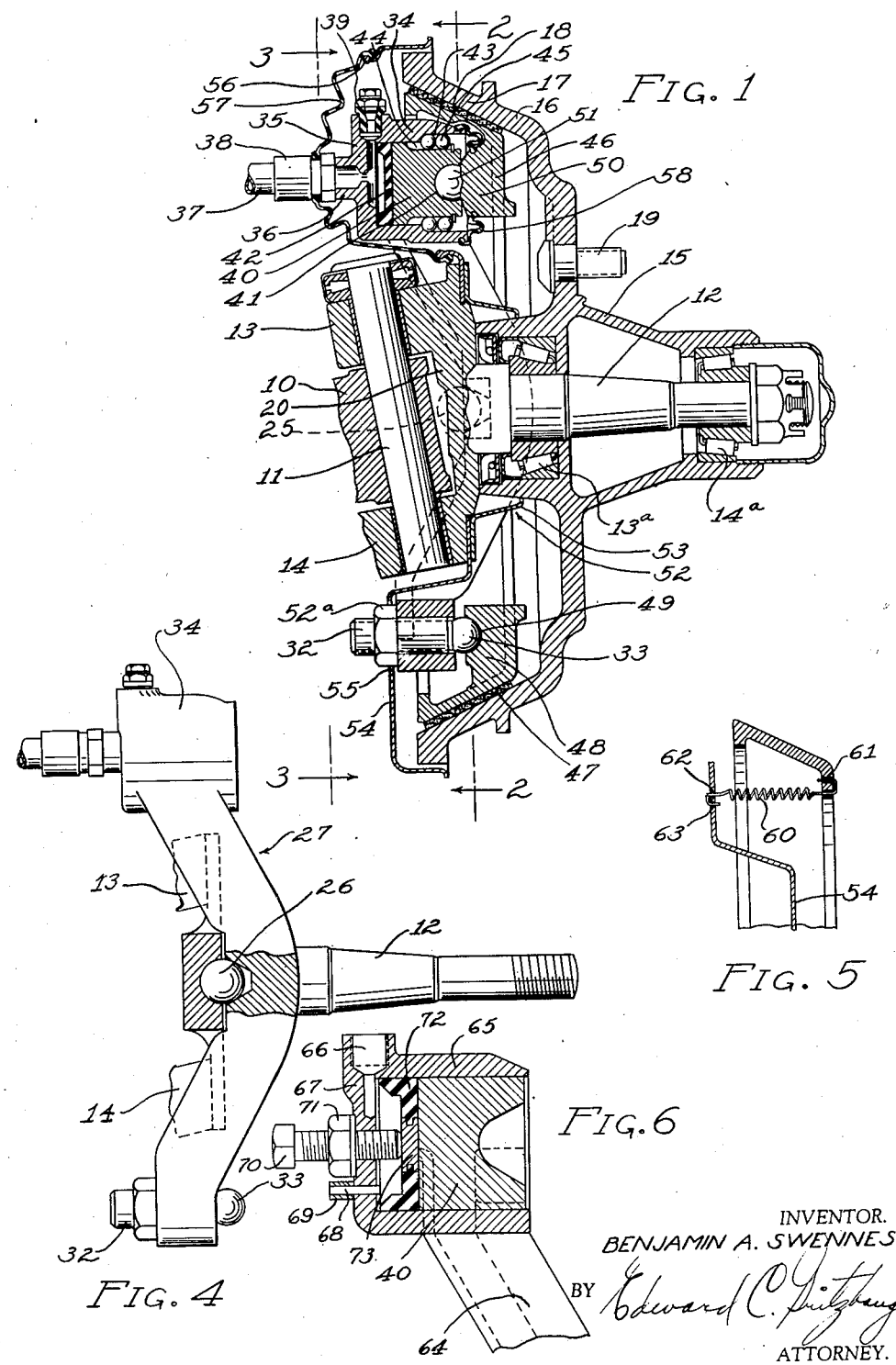
Feb. 28, 1939.　　B. A. SWENNES　　2,148,786
BRAKE
Filed May 23, 1936　　2 Sheets-Sheet 1
INVENTOR.
BENJAMIN A. SWENNES
BY Edward C. Fitzhugh
ATTORNEY.

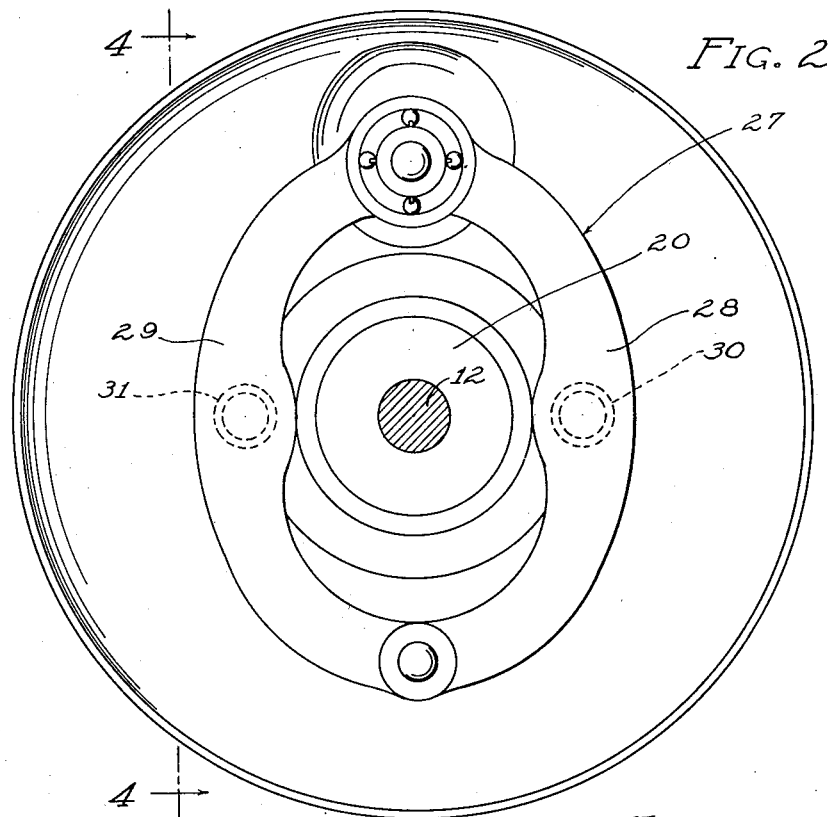
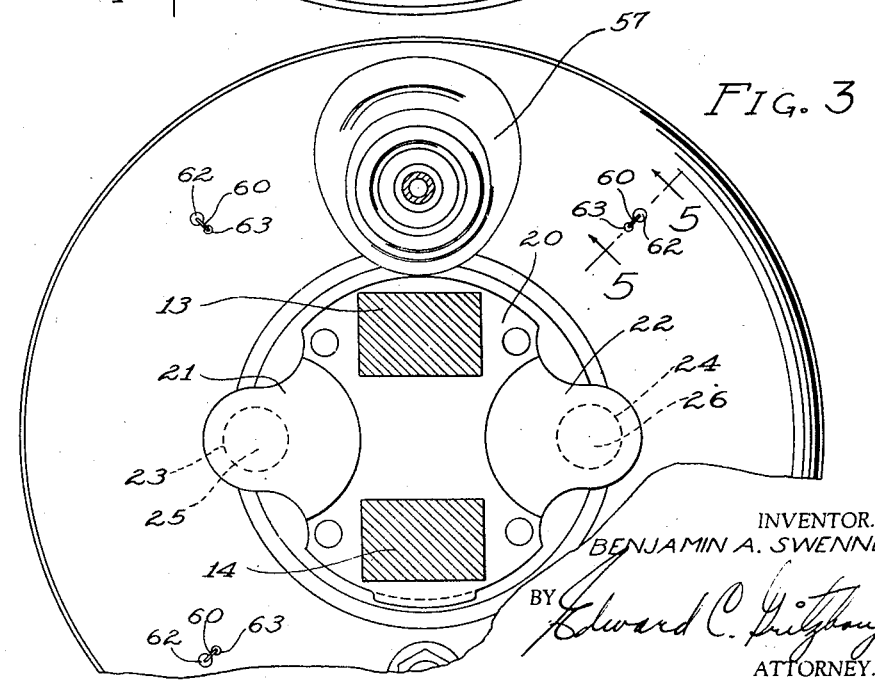

2,148,786

UNITED STATES PATENT OFFICE 2,148,786

BRAKE

Benjamin A. Swennes, Rockford, Ill., assignor to Borg-Warner Corporation, Chicago, Ill., a corporation of Illinois Application May 23, 1936, Serial No. 81,345

4 Claims. (Cl. 188—71)

This invention relates to a brake, and has to do more particularly with improved mechanism operable to laterally thrust a brake shoe into frictional engagement with parts to be braked.

Among the objects of the present invention is the provision of:

A novel brake structure having friction elements coengageable over a large area and brake applying mechanism ensuring uniformity of pressure over the whole of such area.

Improved brake applying means operatively connecting a brake shoe in a manner permitting of universal movement of said shoe so that it can perfectly align itself with a member to be braked.

An improved mechanism enabling a single motor arranged at one side of a brake shoe to distribute brake applying pressure over the entire frictional area of the shoe.

These and other desirable objects of the invention are obtained through the novel arrangement, improved combination and unique structure of the various elements described hereinafter in conjunction with the accompanying two sheets of drawings hereby made a part of this specification, and wherein:

Fig. 1 is a vertical sectional view taken centrally through a brake constructed in accordance with the present invention;

Fig. 2 is a view taken on the line 2—2 of Fig. 1, there being certain parts omitted for clarity;

Fig. 3 is a fragmentary view taken on the line 3—3 of Fig. 1;

Fig. 4 is a side view of a yoke forming a part of the brake of Fig. 1;

Fig. 5 is a fragmentary sectional view of a brake shoe illustrating spring means for retracting such shoe; and Fig. 6 is a fragmentary view of a yoke having piston stop means in the cylinder head thereof.

Corresponding parts shown in the drawings and hereinafter described are designated by the same reference characters.

The brake illustrated in the drawings of this specification is illustrated in combination with the front wheel of an automobile. The front axle of the automobile has an end section 10 shown in Fig. 1. Such end section 10 has secured therein a pivot post 11 upon which is journalled a front wheel spindle 12 having upper and lower bearings 13 and 14 disposed upon the post 11.

Carried rotatively upon the spindle 12 and journalled upon roller bearings 13a and 14a according to standard practice is a wheel hub 15. The wheel hub 15 may have integral therewith a brake drum 16 having a conical section 17 providing thereon an internal braking friction surface 18. A plurality of stud bolts 19, of which one is shown in Fig. 1, may be arranged about the drum 16 for holding a wheel, not shown, upon the hub 15.

The spindle 12 has a head 20 shown plainly in Figs. 2, 3 and 4. In addition to the bearings 13 and 14 upon the head 20, said head has diametrically disposed arms 21 and 22 within which are formed ball seats 23 and 24. Ball bearings 25 and 26 are carried respectively in the seats 23 and 24. Pivotally disposed upon the ball bearings 25 and 26 which serve as a fulcrum therefor is a lever or yoke 27 well illustrated in Figs. 2 and 4. Said yoke 27 has opposed side sections 28 and 29 each having therein conical recesses 30 and 31 which receive respectively the ball fulcrum members 25 and 26. The yoke 27 has threaded into its lower end a bolt 32 having a spherical head 33 upon one of its ends, whereas the opposite end of the yoke has integral therewith a cylindrical guide section 34. Said cylinder or guide section 34 has a head 35 provided with a hollow stem 36 to which is attached an end of a conduit 37 by means of a coupling member 38. A valve plug 39 may be inserted in a side wall of the cylinder 34, said plug 39 being useful to permit escape of air entrapped in the fluid system of the device while operating fluid is being introduced thereinto. The cylinder 34 contains a plunger or piston 40 having in an end thereof a recess 41. A seal member 42 which may be of rubber may be placed upon the opposite end of the piston for reciprocal movement therewith within the cylinder 34. Longitudinal grooves 43 and 44 may be formed in the interior of the cylinder 34 and within the wall of the piston 40 for containing ball bearings 45, which take side thrust between the piston and cylinder during brake application and reduce the force necessary to cause relative movement between the piston and cylinder.

A conical brake shoe 46 is disposed within the drum 16 and is adapted to be advanced axially of the drum. The shoe has secured thereto a hoop-like friction facing element 47 which is pressed frictionally against friction surface 18 of the drum 16 as an incident to such axial advancement of the brake shoe. Upon the lower side of the conical brake shoe 46 is a lug 48 containing a seat 49 having disposed therein the spherical bolt-head 33. A similar lug 50 upon the upper side of the brake shoe 46 may have a ball 51 formed thereon for disposal within the recess 41 of the piston 40.

A dust guard member 52 is secured to the head 20 of the spindle 12. Sufficient clearance is had between the outwardly extending flange 53 of the dust guard and the hub 15 as to permit of the latter rotating without rubbing against said flange. A second and larger dust guard 54 is disposed upon the spindle head 20 at the same section as the dust guard 52. Said dust guard 54 is apertured at 55 for receiving the bolt 32 and providing access to a lock-nut 52a upon said bolt. Also contained within the dust guard or plate 54 is an aperture 56 extending about the cylinder 34 and adapting the cylinder 34 to be moved axially incident to pivotal movement of the lever or yoke 27 as will be presently described. The opening 56 is closed by means of a boot 57 of fabric, rubber or other flexible sheet material. A boot 58 of like material is attached to the wall of cylinder 34 and the lug 50 of the brake shoe 46. The boot 58 is of sufficient length to permit of required relative movement between the cylinder 34 and the brake shoe 46.

In the operation of the device when it is desired to brake rotation of the drum 16 to which the vehicle wheel is attached, fluid under pressure will be introduced into the back or left-end of the cylinder 34, Fig. 1, through the conduit 37. The fluid pressure then exerted between the piston or plunger 40 and the cylinder head 35 will cause relative axial movement of the piston 40 and the cylinder 34. The piston 40 will tend to move to the right, whereas the cylinder 34 will tend to move to the left. Movement of the piston 40 is limited by the upper side of the brake shoe 46 engaging the friction facing 47 with the brake drum 16 and movement of the cylinder 34 and the upper end of the yoke 27, of which such a cylinder forms a part, to the left will be limited by the lower end of the yoke 27 pressing the lower section of the brake shoe facing against the brake drum. It will thus be seen that the introduction of pressure fluid into the cylinder 34 will cause a separation of the upper section of the brake shoe 46 and the upper end of the yoke 27, and that because of the fulcrum support of the yoke 27 upon the balls 25 and 26, the lower end of the yoke will be forced to the right, and hence both the upper and lower sections of the brake shoe will be concurrently advanced into braking relation with the brake drum.

Assurance of equal pressure application over the entire braking area of the conical friction facing element 47 is had because of the universally pivoted mounting of the brake shoe 46. The yoke 27 is adapted to pivot about a horizontal axis defined by the ball fulcrum members 25 and 26 and the brake shoe 46 is adapted to pivot about a vertical axis passing through the spherical bearing members 33 and 51. Inasmuch as the shoe 46 is thus adapted to pivot about either a vertical or a horizontal axis, such shoe is universally movable to adjust itself so that the friction facing element 47 will be pressed flatly and uniformly against the interior of the brake drum 16.

Contraction springs 60 having one end anchored in small apertures 61 in the brake shoe 46 and an opposite end anchored in apertures 62 in the dust guard 54 constantly urge the brake shoe 46 into its retracted position out of contact with the brake drum 16. Small apertures 63 adjacent to apertures 62 may be formed in the dust guard 54, the apertures 63 being adapted to receive the reversely bent parts of the hooks upon the inner end of the springs 60.

A modified form of yoke 64 is shown in Fig. 6. The cylinder 65 upon the upper end of the yoke 64 has a breather passage 66 communicating therewith through the cylinder head 67. Said passage 66 is closed after the brake-operating fluid system is filled. Operating fluid may be forced into the cylinder 65 through an opening 68 passing through a nipple 69. Centrally of the cylinder head 67 is an adjustment bolt 70. Said bolt 70 has a lock nut 71 thereon and may be adjusted axially of the cylinder 65 to limit the relative movement between the piston 40 and the cylinder 65. The seal member 72 movable with the piston 40 has a metal section 73 for registering with and abutting against the end of the bolt 70.

The yoke and cylinder structure just described is adjustable complementally with the bolt 32 to insure proper alignment of the cone or shoe 46 with the brake drum 16. Only a slight axial movement of the shoe 46 is necessary to press it against the brake drum 16 and consequently the said shoe is very close to the drum 16 while the brake is released. To insure, therefore, no rubbing between the shoe 46 and the brake drum 16 during brake release the shoe must be in a vertical plane. Such adjustment of the shoe 46 is had by means of the bolts 32 and 70. When the brake needs adjustment because of brake band wear both bolts 32 and 70 will be adjusted so as to move the brake shoe 46 slightly toward the brake drum 16. An additional function of the bolt 70 is to prevent the cylinder 40 pressing the seal member 72 against the cylinder head and injuring such member upon release of the brake.

I claim:

1. In a brake for a rotating member, the combination of a brake core having a pair of fulcrums disposed diametrically opposite with respect to the rotational axis of said member, a yoke having side sections respectively on said fulcrums and pivotal about an axis defined by said fulcrums, a brake shoe advanceable axially of said member and having sections thereon for receiving actuating force, said brake shoe sections being diametrically opposite with respect to the rotational axis of said member, pivotal connections between the ends of said yoke and said shoe sections and permitting of pivotal movement of said shoe about an axis normal to the axis defined by said fulcrums, and means for separating said yoke and said shoe at one of said pivotal connections therebetween.

2. In a brake for a rotating member, the combination of a brake core having a pair of fulcrums disposed diametrically opposite with respect to the rotational axis of said member, a yoke having side sections respectively on said fulcrums and pivotal about an axis defined by said fulcrums, said yoke also having end sections and a plunger guide upon one of such sections, said end sections being diametrically opposite with respect to the rotational axis of said member and being in registry with an axis normal to the axis defined by said fulcrums, a plunger in said plunger guide, a brake shoe advanceable axially of said member, a pivotal connection between one of said yoke end sections and said shoe, a pivotal connection between said plunger and another section of said shoe, said pivotal connections adapting said shoe to pivot about the second named axis, and said plunger guide being adapted to receive fluid under pressure to effect relative movement between said guide and said plunger and cause separation of the guide part of said yoke and the part of the shoe to which said plunger is connected.

3. In a brake including a rotatable brake drum housing, a brake shoe, means mounting said brake shoe for non-rotatable axial movement into engagement with said drum, said mounting means comprising a fulcrum fixed against axial movement, an actuating lever pivotally mounted intermediate the ends thereof on said fulcrum, means pivotally attaching each of the ends of said lever to said shoe at diametrically opposed points on said shoe, said arrangement being particularly characterized by the fact that at least one of said pivotal attaching means is made adjustable in a direction generally parallel to the axis of rotation of said rotatable brake drum, said adjustable attaching means comprising a plunger-type fluid motor interposed between the end of said lever and said brake shoe, whereby the axial movement of said plunger is operable to force the end of said lever away from said shoe and at the same time to uniformly effect the movement of said shoe into engagement with said brake housing.

4. In a brake including a rotatable brake drum housing, a brake shoe, means mounting said brake shoe for non-rotatable axial movement into engagement with said drum, said mounting means comprising a fulcrum fixed against axial movement, an actuating lever pivotally mounted intermediate the ends thereof on said fulcrum, means pivotally attaching each of the ends of said lever to said shoe at diametrically opposed points on said shoe, said arrangement being particularly characterized by the fact that at least one of said pivotal attaching means is made adjustable in a direction generally parallel to the axis of rotation of said rotatable brake drum, said adjustable attaching means including a plunger-type fluid motor interposed between the end of said lever and said brake shoe, said fluid motor comprising a cylinder housing having its axis substantially parallel to the axis of rotation of said brake drum, a plunger mounted for reciprocation within said housing, a plurality of steel balls positioned between said plunger and said housing and ball and socket means connecting said plunger with said shoe, whereby to reduce friction and facilitate free pivotal movement of said shoe relative to said piston.

BENJAMIN A. SWENNES.